No. 894,970. PATENTED AUG. 4, 1908.
D. W. MINER.
SEED TESTING APPARATUS.
APPLICATION FILED JAN. 25, 1908.
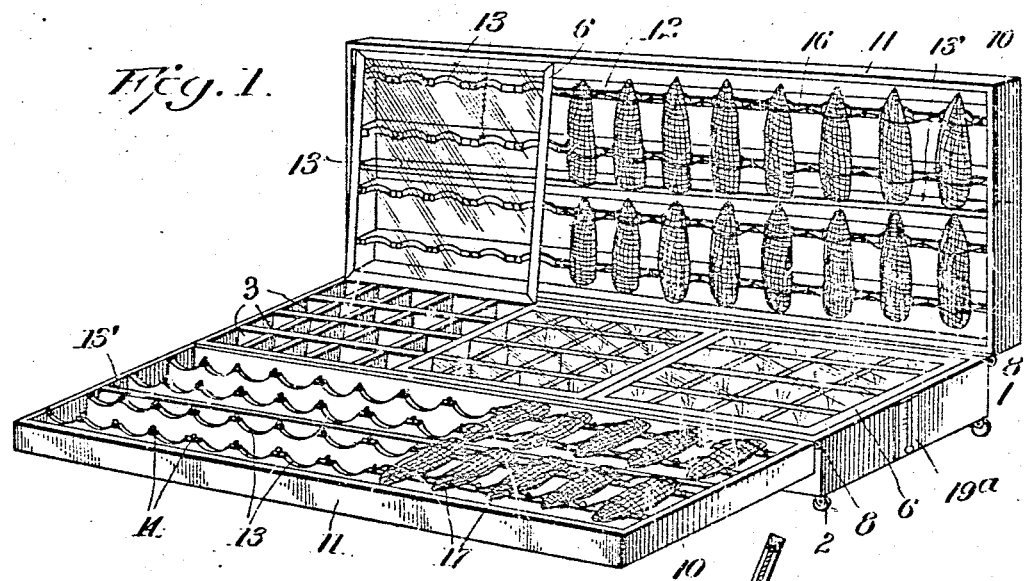
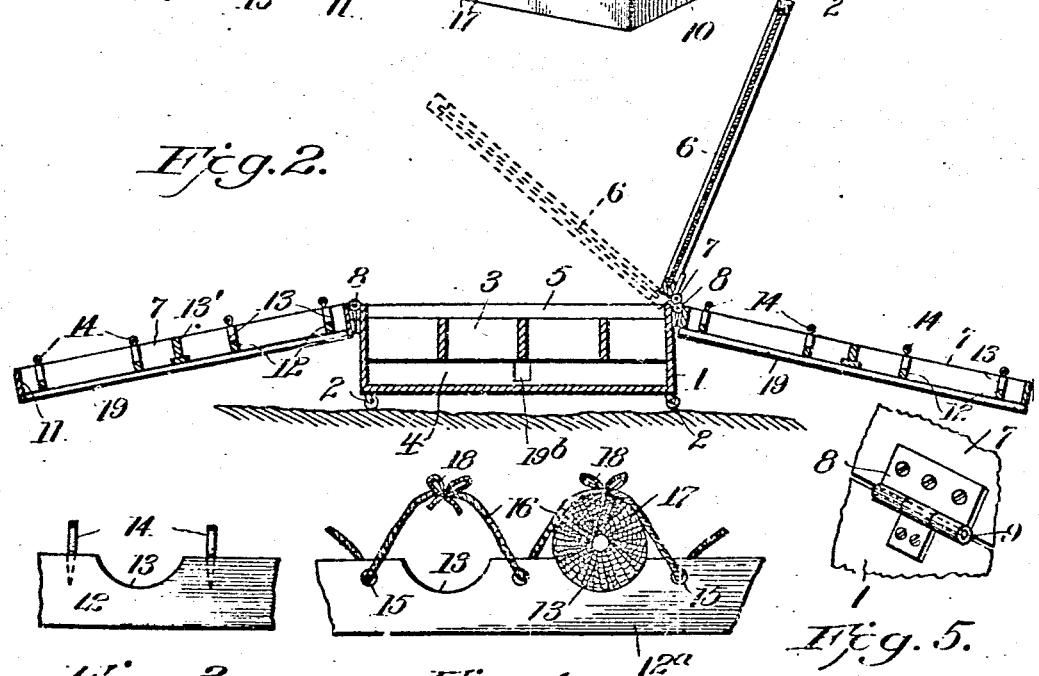
Witnesses
C. H. Walker.
L. E. Fischer.
Inventor
David W. Miner
By E. E. Vrooman,
his Attorney

UNITED STATES PATENT OFFICE.

DAVID W. MINER, OF FAIRFIELD, IOWA.

SEED-TESTING APPARATUS.

No. 894,970.    Specification of Letters Patent.    Patented Aug. 4, 1908.

Application filed January 25, 1908. Serial No. 412,640.

*To all whom it may concern:*

Be it known that I, DAVID W. MINER, a citizen of the United States, residing at Fairfield, in the county of Jefferson and State of Iowa, have invented certain new and useful Improvements in Seed-Testing Apparatus, of which the following is a specification, reference being had therein to the accompanying drawing.

This invention relates to a seed testing apparatus, and particularly to an apparatus for testing seed corn.

The object of the invention is the construction of an apparatus which is provided with racks for supporting ears of corn, and which is also provided with a germinating receptacle or compartment in which the seed from the ears may be germinated.

Another object of the invention is the construction of an apparatus for testing seed, which is provided with means for supporting the seed in bulk, and which is also provided with a germinating receptacle or compartment or compartments, whereby seed can be selected from the bulk and placed in the germinating compartment to allow the germination thereof, for the purpose of testing the seed prior to the planting of large quantities of the same.

A further object of the invention is the construction of a testing apparatus comprising a minimum number of parts, which is simple in structure and comparatively inexpensive to manufacture or construct.

With these and other objects in view, the invention consists of certain novel constructions, combinations, and arrangements of parts, as will be hereinafter fully described and claimed.

In the drawings: Figure 1 is a perspective view of an apparatus constructed in accordance with the present invention. Fig. 2 is a transverse, sectional view of the structure depicted in Fig. 1. Fig. 3 is a fragmentary view, in side elevation, of the rack-frame, while Fig. 4 is a similar view of another form of said frame. Fig. 5 is a perspective view of one of the hinges, by means of which the racks are secured to the germinating box or receptacle.

Referring to the drawings by numerals, 1 designates a germinating receptacle, or box, which is, preferably, rectangular in shape; said receptacle 1 is provided with sides and a bottom, and to the bottom are secured suitable rollers 2, for facilitating the moving of the receptacle or box upon a support.

Within the receptacle 1 is positioned a removable partitioning-frame 3; the frame 3 is, preferably, of less height than the receptacle 1, whereby a compartment 4 is formed in said receptacle below the frame, and a compartment 5 is formed in said receptacle or box 1 above said frame, Fig. 2. When it is desired to germinate seed, soil, or dirt, is placed in the compartment 4, and in the small compartments formed by the partitioning or dividing frame 3. The soil is not heaped up in the compartment 5, for said compartment 5 is normally filled by hinged sashes 6. The sashes 6 are, preferably, hinged, at 7, to the side of the receptacle or box 1. These sashes are employed for facilitating the germinating of the seed, after they have been placed in the soil in the different compartments formed by the partitioning or dividing frame 3.

Upon opposite sides of the germinating receptacle, or box 1, I, preferably, place detachable rack-frames 7; each frame 7 is attached to the receptacle or box 1, by means of one or more sectional hinges 8, each of which hinges 8 is provided with a detachable pin 9, whereby, as soon as the pin or pins 9 are removed from said hinges, the rack-frame can be detached from the receptacle. The rack-frame comprises ends 10 and sides 11. Extending longitudinally of the sides, are racks 12, each of which is provided with notches 13. The notches of the racks register, so as to receive the ears of corn. Extending longitudinally of the sides 11 are also partitioning or divisional boards or cleats 13', which prevent the ears from sliding inwardly too far; these partitions or divisional boards 13' facilitate the holding of the ears in their racks.

In Figs. 1 to 3, I have shown, preferably, eye-bolts 14 secured to the upper edge of the racks 12, and these eye-bolts are, preferably, placed between each two contiguous notches 13.

In Fig. 4, I have shown the rack $12^a$, provided with a transverse aperture 15, between each two contiguous notches, and these apertures 15 perform the same function as the eye-bolts 14, to wit: They receive a fastening member, as for instance, a cord, or rope 16, which is threaded through the eye-bolts or apertures 15 and passed over the ears 17, and upon the fastening means or cords being drawn taut, the ears are securely fastened within the notches 13 of the racks. As illustrated in Fig. 4, pieces of cord or rope, or any suitable fastening means, may be threaded through the securing means, constituted by eye-bolts 14, or the like, and tied, at 18.

When the rack-frames 10 have been secured to the germinating receptacle 1, and the soil placed in said receptacle, ears can be placed in the notches of the racks, and as each ear is so placed, a seed or seeds can be taken from each ear and placed in the respective compartment of the partitioning or dividing frame, within the germinating receptacle. The ear and the respective testing compartment of the germinating receptacle can be suitably designated by any kind of means, so that when the seed has germinated or sprouted, or if it fails to germinate, the results relative to each particular ear, can be quickly determined and the ear accepted or rejected.

From the foregoing description, it will be obvious that the rack-frames contitute supporting means for carrying seeds of different kinds or species in bulk, and the germinating receptacle or box is provided with compartments for receiving and germinating seed from each respective variety carried by the rack-frames. Furthermore, I have illustrated an apparatus, which is provided with detachable rack-frames, preferably, hinged to the germinating receptacle, these rack-frames being detachably secured thereto for facilitating the disassembling of the apparatus, if it is desired to store the same or to pack said structure prior to shipment. Each rack-frame is provided with transverse cleats 19 secured at the bottom, reinforcing and strengthening, as well as supporting, the racks 12.

In Fig. 2, the rack-frames are shown in their normal position, when the apparatus is being used, and in Fig. 1, I have shown one of the rack-frames in a vertical position. The sashes 6 fit snug within the germinating receptacle and rest upon the upper edges of the dividing frame 3. When it is desired, the sashes 6 can be raised for ventilation, or when the sun's rays are too strong. A thermometer 19ª is attached to the germinating receptacle 1, in any suitable manner, for indicating the temperature of the air or soil in the germinating receptacle. If it is desired, a thermometer may be placed at both ends of the receptacle 1, and in either case, an aperture or opening 19ᵇ (Fig. 2) is formed upon the end behind the thermometer, so that the earth or soil in the receptacle will come in contact with the same, and thereby cause the thermometer to register the temperature thereof.

What I claim is:

1. In a seed testing apparatus, the combination of a horizontal germinating receptacle, horizontal rack-frames hinged to opposite portions of the germinating receptacle and being adapted to be swung up to a vertical position above the germinating receptacle, each rack-frame provided with means for supporting and securing an ear in a horizontal position thereon.

2. In a seed testing apparatus, the combination of a horizontal germinating receptacle, a rack-frame hinged to one side of said germinating receptacle and being adapted to be swung upward above the receptacle, and ear-supporting and fastening means for securing an ear in a transverse position upon and carried by the rack-frame.

3. In a seed testing apparatus, the combination of a receptacle provided with a dividing frame, said receptacle provided with a compartment above and below said dividing frame, and a sash normally positioned in the compartment formed above the dividing frame.

4. In a seed testing apparatus, the combination of a germinating receptacle, a dividing frame suspended between the sides and ends of said receptacle, and transparent means positioned in said receptacle above the dividing frame.

5. In a seed testing apparatus, the combination with a germinating receptacle, of an ear-supporting frame hinged to and adapted to swing above said germinating receptacle, said rack-frame provided with a notch adapted to receive an ear in a horizontal position.

6. In a seed testing apparatus, the combination with a germinating receptacle, of a rack-frame secured to said receptacle, said frame provided with racks, and said racks provided with registering ear-supporting notches or sockets.

7. In a seed testing apparatus, the combination with a germinating receptacle, of ear supporting means positioned contiguous to said receptacle, and flexible fastening means carried by said ear-supporting means and adapted to be drawn taut for holding an ear upon said ear-supporting means.

8. In a seed testing apparatus, the combination of a rack-frame provided with a rack having an ear-supporting socket, and fastening means carried by said rack upon opposite sides of said socket and being capable of securing an ear in said socket.

9. In a seed testing apparatus, the combination of a rack-frame provided with parallel racks, and flexible ear fastening means carried by one of said racks.

10. In a seed testing apparatus, the combination of a rack-frame provided with a central partition, ear-supporting means upon opposite sides of said partition, and adjustable fastening means for holding ears upon said racks.

11. In a seed testing apparatus, the combination of a rack-frame provided with a rack, and adjustable fattening means attached to said rack and being adapted to secure an ear thereon.

12. In a seed testing apparatus, the combination of a rack-frame provided with a rack-member, flexible means carried by said member, and said flexible means being adapted to fasten a plurality of ears upon said rack when the same is drawn taut.

13. In a seed testing apparatus, the combination with a germinating receptacle, of ear-supporting means attached to said germinating receptacle, said ear-supporting means provided with a plurality of registering notches adapted to receive an ear and hold the same upon said supporting means in a horizontal position.

14. In a seed testing apparatus, the combination with a germinating receptacle, of seed-supporting means positioned contiguous to said receptacle, said seed-supporting means provided with seed-holding means, whereby a plurality of different species of seeds can be held in bulk thereon, and adjustable fastening means for preventing the seed in bulk from being spilled or displaced off of said supporting means.

15. In a seed testing apparatus, the combination of a rack-frame provided with means for supporting a plurality of ears thereon, and means adapted to partly pass around ears and interlaced between the ears and attached to said rack and being capable of fastening ears upon said rack.

16. In a seed testing apparatus, the combination with a germinating receptacle, of a rack-frame attached to said receptacle, said rack-frame provided with a rack having an ear-supporting notch or socket formed therein, and a flexible fastening member passing over said ear and attached to said rack.

17. In a seed testing apparatus, the combination with a germinating receptacle, of a rack frame positioned contiguous to said receptacle, said frame provided with a plurality of racks, said racks provided with registering ear-receiving sockets.

In testimony whereof I hereunto affix my signature in presence of two witnesses.

DAVID W. MINER.

Witnesses:
OSCAR JOHNSON,
A. D. LONG.